US011126908B2

(12) United States Patent
Stewart

(10) Patent No.: US 11,126,908 B2
(45) Date of Patent: *Sep. 21, 2021

(54) CARDS AND METHODS OF READING THE SAME

(71) Applicant: Dominic M. Kotab, San Jose, CA (US)

(72) Inventor: Roger Green Stewart, Morgan Hill, CA (US)

(73) Assignee: Dominic M. Kotab, San Jose, CA (US)

( * ) Notice: Subject to any disclaimer, the term of this patent is extended or adjusted under 35 U.S.C. 154(b) by 566 days.

This patent is subject to a terminal disclaimer.

(21) Appl. No.: 15/295,885

(22) Filed: Oct. 17, 2016

(65) Prior Publication Data
US 2017/0032240 A1 Feb. 2, 2017

Related U.S. Application Data

(60) Continuation of application No. 14/053,534, filed on Oct. 14, 2013, now Pat. No. 9,477,918, which is a continuation of application No. 12/732,138, filed on Mar. 24, 2010, now Pat. No. 8,576,078, which is a division of application No. 11/124,486, filed on May 6, 2005, now Pat. No. 7,714,726.

(51) Int. Cl.
G06K 19/07 (2006.01)
G06K 19/077 (2006.01)
H01Q 1/22 (2006.01)
G06K 19/04 (2006.01)
G06K 7/10 (2006.01)

(52) U.S. Cl.
CPC ... *G06K 19/07773* (2013.01); *G06K 7/10316* (2013.01); *G06K 19/047* (2013.01); *G06K 19/0702* (2013.01); *H01Q 1/2225* (2013.01)

(58) Field of Classification Search
CPC ...... G06K 7/0008; G06K 13/08; G06K 7/086; G06K 19/047; G06K 19/07773; G06K 7/10316; G06K 19/0702
USPC .............................. 235/439; 463/25; 273/309
See application file for complete search history.

(56) References Cited

U.S. PATENT DOCUMENTS

| 5,963,134 A * | 10/1999 | Bowers ................... G06Q 10/08 340/572.1 |
| 6,283,856 B1 | 9/2001 | Mothwurf |
| 6,741,178 B1 * | 5/2004 | Tuttle .................... G01S 13/758 156/213 |
| 7,683,789 B2 | 3/2010 | Stewart et al. |
| 9,477,918 B2 * | 10/2016 | Stewart ................ H01Q 1/2225 |
| 9,508,213 B2 | 11/2016 | Kotab |
| 10,510,208 B2 | 12/2019 | Kotab |
| 10,706,681 B2 | 7/2020 | Kotab |
| 2003/0006121 A1 | 1/2003 | Lee et al. |

(Continued)

OTHER PUBLICATIONS

Notice of Allowance from U.S. Appl. No. 13/069,278, dated Jul. 27, 2016.

(Continued)

*Primary Examiner* — Ahshik Kim
(74) *Attorney, Agent, or Firm* — Zilka-Kotab, P.C.

(57) ABSTRACT

A card according to one embodiment includes an RFID circuit on or within a substrate and an antenna coupled to the RFID circuit, where the card is configured such that a signal associated with the card is capable of being read by at least one RF reader.

15 Claims, 2 Drawing Sheets

(56) References Cited

U.S. PATENT DOCUMENTS

| | | | |
|---|---|---|---|
| 2004/0207156 A1* | 10/2004 | Soltys | G07F 17/3223 273/292 |
| 2005/0054408 A1* | 3/2005 | Steil | A63F 1/18 463/11 |
| 2005/0110210 A1* | 5/2005 | Soltys | A63F 1/14 273/149 P |
| 2005/0121852 A1* | 6/2005 | Soltys | A63F 1/18 273/149 P |
| 2006/0001211 A1* | 1/2006 | Lewis | A63F 1/18 273/149 R |
| 2006/0115797 A1 | 6/2006 | Gray | |
| 2006/0208066 A1* | 9/2006 | Finn | G06K 7/0004 235/380 |
| 2006/0208958 A1 | 9/2006 | Stewart et al. | |
| 2006/0217185 A1 | 9/2006 | Cavagna | |
| 2006/0287068 A1 | 12/2006 | Walker et al. | |
| 2007/0035399 A1 | 2/2007 | Hecht et al. | |
| 2007/0060311 A1 | 3/2007 | Rowe et al. | |
| 2007/0117623 A1* | 5/2007 | Nelson | G07F 17/3255 463/29 |
| 2007/0225055 A1* | 9/2007 | Weisman | A63F 1/14 463/11 |
| 2007/0293303 A1 | 12/2007 | Shayesteh | |
| 2008/0009339 A1 | 1/2008 | Pat et al. | |
| 2008/0113771 A1 | 5/2008 | Baerlocher et al. | |
| 2009/0075723 A1 | 3/2009 | Richard et al. | |
| 2009/0201131 A1 | 8/2009 | Delia et al. | |
| 2009/0233699 A1 | 9/2009 | Koyama | |
| 2010/0001862 A1 | 1/2010 | Wilson et al. | |
| 2010/0093429 A1* | 4/2010 | Mattice | G07F 1/06 463/25 |
| 2011/0227703 A1 | 9/2011 | Kotab | |
| 2012/0038445 A1* | 2/2012 | Finn | G06K 19/07794 336/105 |
| 2014/0034732 A1 | 2/2014 | Stewart | |
| 2017/0061735 A1 | 3/2017 | Kotab | |
| 2020/0066097 A1 | 2/2020 | Kotab | |
| 2020/0294357 A1 | 9/2020 | Kotab | |

OTHER PUBLICATIONS

Supplemental Notice of Allowance from U.S. Appl. No. 13/069,278, dated Aug. 5, 2016.
Kotab, D., U.S. Appl. No. 15/353,648, filed Nov. 16, 2016.
Restriction Requirement from U.S. Appl. No. 15/353,648, dated Jan. 11, 2018.
Kotab, D., U.S. Appl. No. 16/286,415, filed Feb. 26, 2019.
Non-Final Office Action from U.S. Appl. No. 16/286,415, dated Apr. 15, 2019.
Non-Final Office Action from U.S. Appl. No. 15/353,648 dated Apr. 18, 2018.
Final Office Action from U.S. Appl. No. 15/353,648 dated Nov. 28, 2018.
Advisory Action from U.S. Appl. No. 15/353,648, dated Feb. 8, 2019.
Notice of Allowance from U.S. Appl. No. 16/286,415, dated Aug. 7, 2019.
Corrected Notice of Allowance from U.S. Appl. No. 16/286,415, dated Oct. 15, 2019.
Non-Final Office Action from U.S. Appl. No. 16/670,980, dated Nov. 29, 2019.
Kotab, D., U.S. Appl. No. 16/670,980, filed Oct. 31, 2019.
Notice of Allowance from U.S. Appl. No. 16/670,980, dated Mar. 9, 2020.
Kotab, D., U.S. Appl. No. 16/886,373, filed May 28, 2020.
Non-Final Office Action from U.S. Appl. No. 16/886,373, dated Oct. 23, 2020.
Final Office Action from U.S. Appl. No. 16/886,373, dated Mar. 18, 2021.
Advisory Action from U.S. Appl. No. 16/886,373, dated May 24, 2021.
Non-Final Office Action from U.S. Appl. No. 16/886,373, dated Jun. 18, 2021.

\* cited by examiner

CARDS AND METHODS OF READING THE SAME

RELATED APPLICATIONS

This application is a continuation of U.S. patent application Ser. No. 14/053,534 (now U.S. Pat. No. 9,477,918), filed Oct. 14, 2013, which is a continuation of U.S. patent application Ser. No. 12/732,138 (now U.S. Pat. No. 8,576,078), filed Mar. 25, 2010, which is a divisional of U.S. patent application Ser. No. 11/124,486 (now U.S. Pat. No. 7,714,726), filed May 6, 2005, from each of which priority is claimed.

FIELD OF THE INVENTION

The present invention relates to Radio Frequency Identification (RFID) tags, and more particularly, this invention relates to RF antennas that do not significantly interfere with RF energy in their vicinity, thereby allowing such things as stacking of tags.

BACKGROUND

Radio Frequency Identification (RFID) technology employs a radio frequency ("RF") wireless link and ultra-small embedded computer circuitry. RFID technology allows physical objects to be identified and tracked via these wireless "tags". It functions like a bar code that communicates to the reader automatically without requiring manual line-of-sight scanning or singulation of the objects. RFID promises to radically transform the retail, pharmaceutical, military, and transportation industries.

Several advantages of RFID technology are summarized in Table 1:

Table 1
Identification without visual contact
Able to read/write
Able to store information in tag
Information can be renewed anytime
Unique item identification
Can withstand harsh environment
Reusable
High Flexibility/Value As shown in FIG. 1, a basic RFID system 100 includes a tag 102, a reader 104, and an optional server 106. The tag 102 includes an integrated circuit (IC) chip and an antenna. The IC chip includes a digital decoder needed to execute the computer commands the tag 102 receives from the tag reader 104. The IC chip also includes a power supply circuit to extract and regulate power from the RF reader; a detector to decode signals from the reader; a back-scattering modulator to send data back to the reader; anti-collision protocol circuits; and at least enough EEPROM memory to store its EPC code.

Communication begins with a reader 104 sending out signals to find the tag 102. When the radio wave hits the tag 102 and the tag 102 recognizes the reader's signal, the reader 104 decodes the data programmed into the tag 102. The information can then be passed to a server 106 for processing, storage, and/or propagation to another computing device. By tagging a variety of items, information about the nature and location of goods can be known instantly and automatically.

The system uses reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:
Class-1
Identity tags (RF user programmable, maximum range ~3 m)
Class-2
Memory tags (8 bits to 128 Mbits programmable at maximum ~3 m range)
Security & privacy protection
Class-3
Battery tags (256 bits to 64 Kb)
Self-Powered Backscatter (internal clock, sensor interface support)
~100 meter range
Class-4
Active tags
Active transmission (permits tag-speaks-first operating modes)
Up to 30,000 meter range In RFID systems where passive receivers (i.e., Class-1 tags) are able to capture enough energy from the transmitted RF to power the device, no batteries are necessary. In systems where distance prevents powering a device in this manner, an alternative power source must be used. For these "alternate" systems (also known as active or semi-passive), batteries are the most common form of power. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

Conventional RFID tags interact strongly with the electrical and magnetic fields near them; in fact most are resonant with Q-factors ranging between 5 and 100. Unfortunately, this also means that these tags also interact very strongly with each other in ways that often prevents the tags from being read at all. The problem becomes even worse when the tagged objects are thin and flat—like poker chips, currency, documents, etc. In such a stack, the energy received by each object/tag is highly non-uniform, with the outermost objects receiving most of the energy and the interior objects shielded by the outer objects and receiving virtually no energy at all. In other words, the antenna of the outer tag serves as a Faraday shield to anything behind it. The tags on the outside of the stack will continue to work well, but the tags on the inside of the stack work very poorly if at all. For these reasons conventional wisdom was that it impossible to read a stack of tagged items.

As touched on above, in addition to blocking RF energy, the antennae interfere with RF energy in their vicinities, potentially rendering the RF signal unreadable to tags nearby. This phenomenon is best understood by considering the radar profile of the antenna. The radar profile of the antenna may often be larger than the actual physical profile of the antenna, and can be a large as 100× the physical profile of the antenna. Accordingly, the problems mentioned above can also be found in assemblies of tagged objects that are not necessarily stacked.

There are many instances where tags could be stacked or assembled in close proximity. One implementation is in poker chips. Another is paper objects such as birth certificates, paper currency, etc. Significant tag-to-tag interactions and variability also occur even with a row of tagged objects sitting on a shelf. It would be desirable to read a stack of poker chips, stack of tagged currency, file of papers, etc. in one pass via RFID technology.

SUMMARY OF THE INVENTION

A card according to one embodiment includes an RFID circuit on or within a substrate and an antenna coupled to the RFID circuit, where the card is configured such that a signal associated with the card is capable of being read by at least one RF reader.

An RFID system according to one embodiment includes at least one RF reader, and a plurality of cards, where each of the plurality of cards includes an RFID circuit on or within a substrate, and an antenna coupled to the RFID circuit, where the RFID circuit has an input impedance greater than an impedance of the antenna, and where each of the plurality of cards are configured such that a signal associated with each of the cards is capable of being read by the at least one RF reader.

A card according to another embodiment includes an RFID circuit and an antenna coupled to the RFID circuit, where the card is configured such that a signal associated with the card is capable of being read by at least one RF reader, and where the card is configured such that the antenna minimally affects electromagnetic RF fields in a vicinity of the antenna.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is the best embodiment presently contemplated for carrying out the present invention. This description is made for the purpose of illustrating the general principles of the present invention and is not meant to limit the inventive concepts claimed herein.

A Radio Frequency (RF) device with a circuit and a "semitransparent" antenna. The semitransparent antenna gathers some of the RF energy, but most of the energy in the RF wave does not couple into the antenna. Accordingly, because the antenna minimally affects the electromagnetic RF fields surrounding the antenna even in the vicinity of the antenna, assemblies of objects carrying the RF devices can be formed while maintaining acceptable communications with the RF devices.

Figure 1:
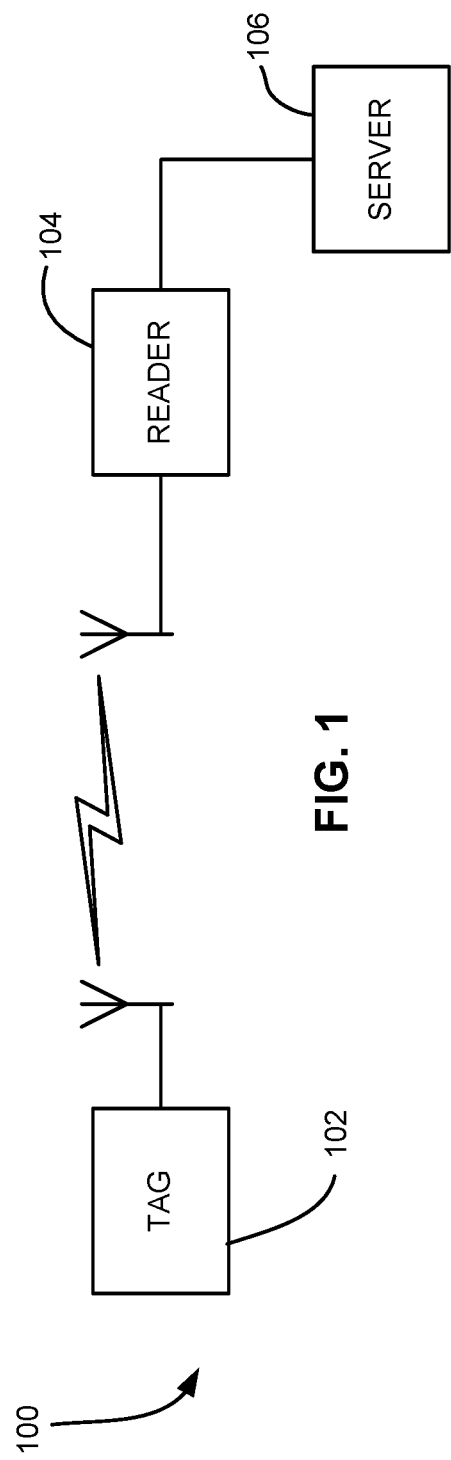
FIG. 1 is a system diagram of an RFID system.

Many types of devices can take advantage of the embodiments disclosed herein, including but not limited to Radio Frequency Identification (RFID) systems and other wireless devices/systems; pacemakers; portable electronic devices; remote controllers for televisions, audio devices, and other electronic devices; smoke detectors; etc. To provide a context, and to aid in understanding the various embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. Examples of hardware include Application Specific Integrated Circuits (ASICs), printed circuits, monolithic circuits, reconfigurable hardware such as Field Programmable Gate Arrays (FPGAs), etc. Further, the methodology disclosed herein can also be incorporated into a computer program product, such as a computer disc containing software. Further, such software can be downloadable or otherwise transferable from one computing device to another via network, nonvolatile memory device, etc.

Figure 2:
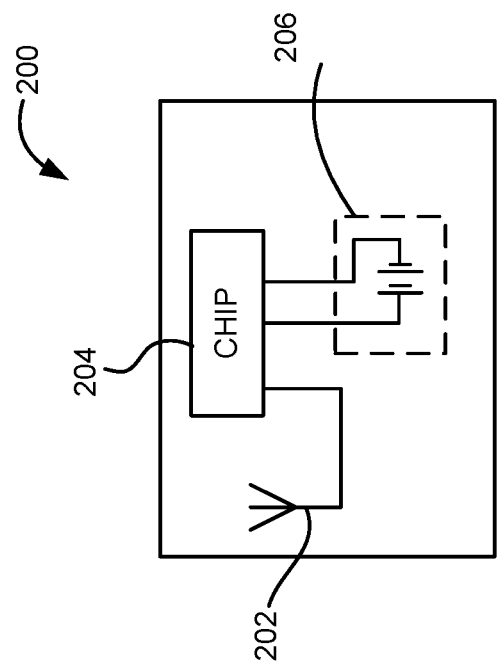
FIG. 2 is a high level circuit diagram showing a circuit for implementation in a RF device according to one embodiment.

FIG. 2 illustrates a Radio Frequency (RF) device 200, e.g., RFID tag according to one embodiment. The radio frequency data communication device 200 includes an integrated circuit 204, a power source 206 connected to the integrated circuit 204 to supply power to the integrated circuit 204, and at least one antenna 202 connected to the integrated circuit 204 for radio frequency transmission and reception by the integrated circuit 204. For purposes of this disclosure, including the appended claims, the term "integrated circuit" and "circuit" shall be defined as a combination of interconnected circuit elements associated on or within a continuous substrate. For purposes of this disclosure, including the appended claims, the term "semiconductive substrate" is defined to mean any construction comprising semiconductive material, including, but not limited to, bulk semiconductive materials such as a semiconductive wafer (either alone or in assemblies comprising other materials thereon), and semiconductive material layers (either alone or in assemblies comprising other materials). For purposes of this disclosure, including the appended claims, the term "substrate" refers to any supporting structure, including, but not limited to, the semiconductive substrates described above, printed circuit boards (PCBs), adhesive backings, etc. In the embodiment illustrated in FIG. 2, the integrated circuit 204 is a monolithic integrated circuit. For purposes of this disclosure, including the appended claims, the term "monolithic integrated circuit" shall be defined as an integrated circuit wherein all circuit components are manufactured into or on top of a single chip of silicon or layer of semiconductive material. The integrated circuit 204 will be described in greater detail below. The power source 206 is a battery and/or a power supply circuit that extracts and regulates power from the RF reader signal.

The radio frequency data communication device 200 can be included in any appropriate housing or packaging, made of plastic or any other suitable material. The device 200 is of a small size that lends itself to applications employing small housings, such as cards, miniature tags, etc. Larger housings can also be employed. The device 200, housed in any appropriate housing, can be supported from or attached to an object in any desired manner; for example using double sided tape, glue, lanyards, leash, nails, staples, rivets, or any other fastener. The housing can be sewn on to an object, hung from an object, implanted in an object (hidden), etc. A description of illustrative RFID tags, systems, and methods of user are disclosed in U.S. Patent Appl. Pub. No. 2004/0201457A1 to O'Toole et al., which is herein incorporated by reference.

Figure 3:
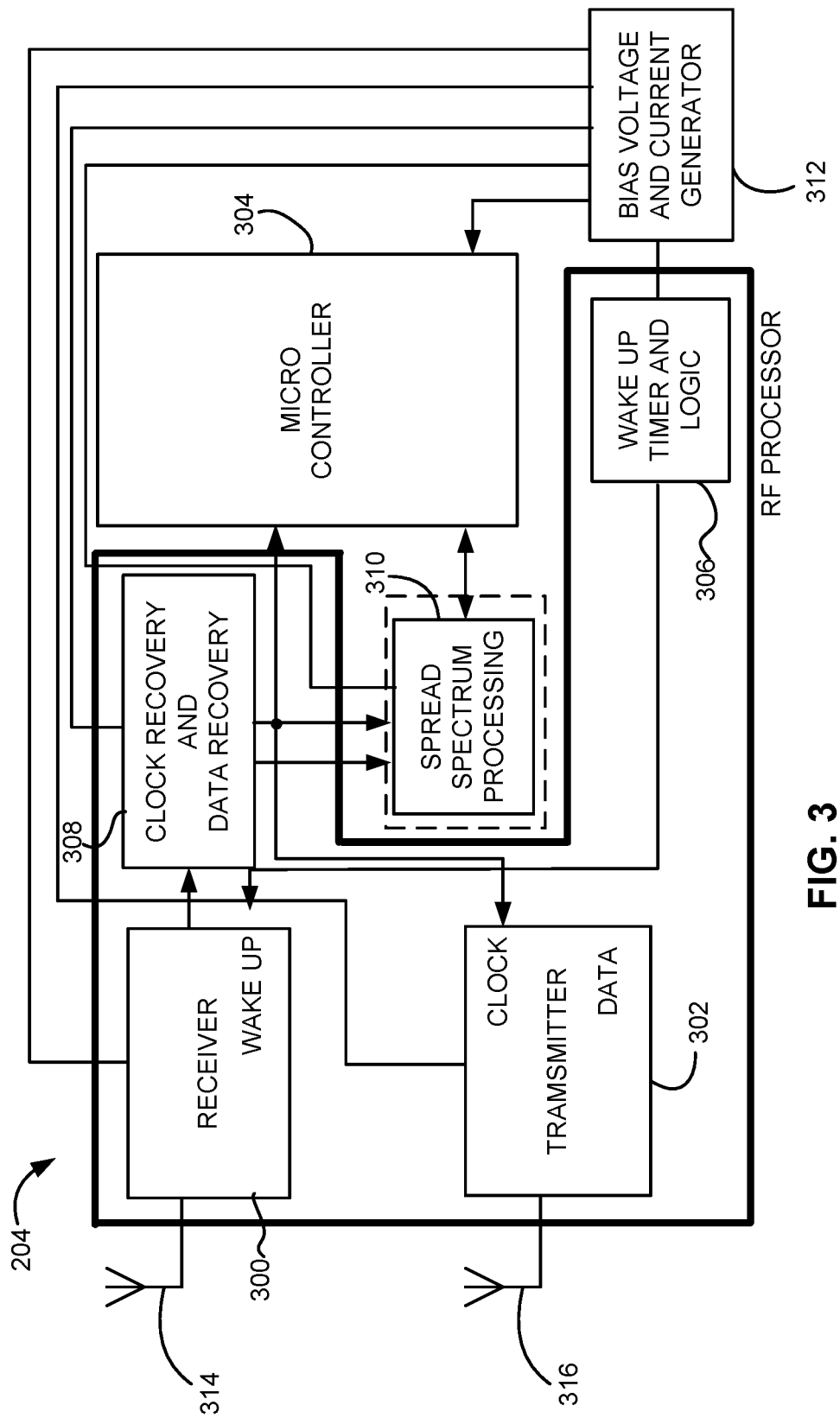
FIG. 3 is a high level circuit diagram of a monolithic semiconductor integrated circuit that may form part of the circuit of FIG. 2.

Various configurations are possible for the antenna 202. The integrated circuit 204 includes a receiver 300 and a transmitter 302 (FIG. 3). In one embodiment, separate antennas 314 and 316 are provided for receiver and transmitter of the integrated circuit 204. In another embodiment (FIG. 2), a single antenna is shared by the receiver and transmitter sections. In one embodiment, the antenna is defined by conductive paste (e.g., epoxy) screened onto a card or housing. In another embodiment, the antenna is formed of a conducting polymer. An advantage of conducting polymers is that the sheet resistivity is controllable in a range from 1 $\Omega$/sq to 1,000,000 $\Omega$/sq. In the illustrated embodiment, the antenna is a planar conductive material such as Iridium Tin Oxide or other suitable high sheet resistance metal-based material conductively bonded to the integrated circuit via bonding pads.

In an embodiment where a single antenna is employed, that single antenna can be a folded dipole antenna defining a continuous conductive path, or loop, of microstrip. Alternatively, the antenna can be constructed as a continuous loop antenna. Additional antenna designs are disclosed in copending U.S. patent application Ser. No. 11/073,239 filed on Mar. 4, 2005 with title "COMPACT OMNI-DIRECTIONAL RF SYSTEM," and which is herein incorporated by reference.

In the embodiments described herein, the tag antennas are designed to control and limit their interactions with the RF fields such that most of the RF wave striking or in the immediate vicinity of the antenna does not couple into the antenna. Thus, the antenna minimally affects the electromagnetic RF fields surrounding the antenna even in the vicinity of the antenna. By "minimally affects" what is meant is that at least about 50%, and preferably greater than about 90%, of the RF energy striking the antenna and in the vicinity of the antenna is useable by another RF device in the vicinity of the tag.

In this antenna design, the inductive impedance elements are reduced and the antenna impedance increased to the point where the residual inductance of the tag antenna has only minimal effect on the antenna's impedance. Such antennas are preferably constructed of a planar conductor having a sheet resistivity of greater than about 1 $\Omega$/sq, preferably greater than about 10 $\Omega$/sq. To prevent excessive loading of this high impedance antenna, the tag circuit input impedance is preferably as high as possible. A total impedance of the RF device presented to the RF wave is preferably greater than about 1000$\Omega$. One embodiment has a resistive impedance of >100K$\Omega$, and an input bypass capacitance of less than 0.02 pf corresponding to a reactive bypass impedance of at least about 10 K$\Omega$. At 900 MHz, a non-resonant antenna design may include fabricating the antenna using conductors with a sheet resistivity of, for instance about 1000 $\Omega$/sq, and designing the tag to have a total tag impedance of perhaps 100K$\Omega$.

The impedance of the semi-transparent tags is adjusted to the objects to which they are attached so that even a tightly packed assembly of such objects will appear to the RF propagating signal as a moderately lossey RF propagation medium. For instance, tags on stackable boxes 10 mm thick could be equipped with 10K$\Omega$ antennas; tags on 1 mm thick poker chips could have 100K$\Omega$ antennas; tags on 0.2 mm thick currency could have 500K$\Omega$ antennas. The total admittance or dissipation-factor of the tag/package system is preferably kept roughly constant per volume so that RF radiation can pass through the assembly without excessive attenuation or reflection.

While the individual performance of these semi-transparent tags will be significantly inferior to the individual performance of conventional tags, the performance of these semi-transparent tags will not be degraded as much by the presence of other near-by semi-transparent tags. For example, while a conventional tagged poker chip might have a 100 m range in free space, the range of that same tagged poker chip would be reduced to less than 0.01 m when sandwiched between a dozen of other similar poker chips.

On the other hand, a poker chip with a semi-transparent design might have a free space range of only 10 m, but continue to work at up to 3 m even when totally surrounded by other poker chips tagged with semi-transparent devices.

This technique therefore provides a way to tag objects and read them even under adverse conditions that has heretofore been considered impossible. This includes directly reading a stack of currency or other paper documents, reading tags on the inside of a stack of poker chips, etc. Preferably, for plurality of RFID tagged objects, an operating range of the objects varies by less than 50% even when the objects are positioned directly adjacent (e.g., on top of or beside) one another.

With continued reference to FIG. 2, if the power source 206 is a battery, the battery can take any suitable form. Preferably, the battery type will be selected depending on weight, size, and life requirements for a particular application. Preferably, the battery is formed by thick film deposition of high-sheet-resistivity materials so that the battery itself is also semi-transparent to the RF carrier signal. Alternatively, a metallic button-type cell could be used as long as the battery size is kept small compared to the wavelength of the RF carrier. Instead of using a battery, other suitable power sources can be employed.

FIG. 3 is a high level circuit schematic of the integrated circuit 204 utilized in the device of FIG. 2. In the embodiment shown in FIG. 3, the integrated circuit 204 is a monolithic integrated circuit. More particularly, in the illustrated embodiment, the integrated circuit 204 includes the receiver 300, the transmitter 302, a micro controller or microprocessor 304, a wake up timer and logic circuit 306, a clock recovery and data recovery circuit 308, and a bias voltage and current generator 312.

In one embodiment, a spread spectrum processing circuit 310 is also included in the integrated circuit 204 and formed relative to the single die. In this embodiment, signals received by the receiver 300 are modulated spread spectrum signals. In an illustrated embodiment, the modulation scheme for replies sent by the transmitter 302 can be selectable. One of the available selections for replies sent by the transmitter 302 is modulated spread spectrum.

In a method of use, an RFID reader sends an interrogation signal to one or more RFID tags in range of the reader. One skilled in the art will appreciate that any suitable communication protocol, including security features, can be used. A tag receiving the signal responds with a tag ID. The reader can then use that tag ID to address that particular tag, causing the tag to transmit its stored data. The stored data can be any variety of information, and is normally associated with the article to which the tag is attached. The reader can then tell the tag to turn-off for now so that it will not continue to respond to the interrogation signal. The reader will then select another tag ID and poll that tag for its data, and so on until all of the tags have been read.

Example 1

Poker chips in a casino each have a passive RF device integrated therein. The reader, present at a blackjack table for instance, sends out an interrogation signal sufficient to read all of the chips at the table (including the players' chips), or at a reduced power to read only those chips in the tray. Upon receiving a response from each tag, the reader or a backend system coupled to the reader can quickly determine the value of the chips on the table and/or in the tray. During active play, this information is useful for historical tracking of the flow of chips in and out of the tray, as well as alerting management to the need to either add chips to the tray or remove chips therefrom. Prior to opening the table or upon closing the table, the chip count in the tray can be quickly and accurately determined by an integrated or portable reader.

Likewise, when a patron wishes to cash out at the cage, the value of a stack of chips can be verified by a reader mounted there and compared against the visual chip count.

This feature would also provide a theft deterrent to dealers who may try to slip chips into their clothing and exit the casino. A reader near the employee exit can be used to detect chips leaving the casino.

Example 2

Currency in a bank is formed into stacks of 50 bills each. Each bill is tagged with a semi-transparent RF device. Several of the stacks are placed in a bag. Prior to passing the bag to the armored car service, the bag is scanned and the value of the currency is recorded electronically and potentially sent to a central server accessible via a network. A paper report can also be provided to the bank and/or armored car service personnel. Upon arrival of the armored car at the Federal Reserve depository, the sealed bag is again scanned and the value is compared to the value it had when it left the bank.

Example 3

Documents, each having a semi-transparent RF device coupled thereto, are stored in a series of rows in a filing room. Someone seeking a particular document passes a portable reader along each row, pair of rows, etc. The reader reads each of the tags in the row(s) within range of the reader. When the reader finds a match, the reader indicates where the document is found, e.g., in row B, section 3.

Example 4

Library books, each having a semi-transparent RF device coupled thereto, are placed in a bin for reshelving. A reader scans the bin and transmits the information to the library server. Books indicated as checked out to patrons have their status automatically updated to indicate the books are available for checkout.

Similarly, during checkout, a patron could set a stack of books on a shelf, where the books are scanned and checked out to the patron. Preferably, the shelf is in a pod or cubicle of shielding material (e.g., metal) that prevents the reader from reading books in adjacent pods.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device, comprising:
   an RFID circuit on or within a substrate; and
   an antenna coupled to the RFID circuit, where the antenna has a sheet resistivity of at least 1 $\Omega$/sq.

2. The device of claim 1, wherein the RFID circuit is included within a stack of objects for scanning by a reader.

3. The device of claim 1, wherein a signal associated with the device is associated with a value of the device.

4. The device of claim 3, wherein the device is configured such that the value of the device is capable of being determined by at least one RF reader.

5. The device of claim 1, wherein the device is configured such that a signal associated with the device is capable of being read by at least one RF reader while the device is in a vicinity of a plurality of other devices.

6. The device of claim 1, wherein the device is configured such that a signal associated with the device is capable of being read by at least one RF reader while the device is in a stack with a plurality of other devices.

7. The device of claim 1, wherein the device is configured such that a signal associated with the device is capable of being read by at least one RF reader while the device is in a tray with a plurality of other devices.

8. The device of claim 1, wherein the device is configured to: receive an interrogation signal from at least one RF reader; and send at least one response to the at least one RF reader in response to the interrogation signal.

9. The device of claim 8, wherein at least one RF reader is capable of determining a value of the device from which the response is received.

10. The device of claim 1, wherein the RFID circuit includes a passive RF device.

11. The device of claim 1, wherein the device further comprises a battery coupled to the RFID circuit.

12. The device of claim 1, wherein the device is configured such that a signal associated with the device is capable of being read by an RF reader associated with a table.

13. An RFID system, comprising:
   at least one RF reader; and
   a plurality of tags, each of the plurality of tags including:
      an RFID circuit on or within a substrate; and
      an antenna coupled to the RFID circuit,
         wherein the RFID circuit has an input impedance greater than an impedance of the antenna;
      wherein each of the plurality of tags are configured such that a signal associated with each of the tags is capable of being read by the at least one RF reader.

14. A tag, comprising:
   an RFID circuit; and
   an antenna coupled to the RFID circuit, the antenna having a sheet resistivity of at least 1 $\Omega$/sq;
   wherein the tag is configured such that a signal associated with the tag is capable of being read by at least one RF reader.

15. The gear of claim 14, wherein a total impedance of each tag presented to a RF wave is greater than 10000.

* * * * *